40-453 SR
8/4/87 OR H 000,317

United States Statutory Invention Registration [19]

[11] Reg. Number: H317

Gladden [43] Published: Aug. 4, 1987

[54] HOLOGRAPHIC AND XOGRAPHIC MAGNETIC NOTE HOLDER STRUCTURES

[76] Inventor: Bruce W. Gladden, 6322 Dogwood Dr., Orlando, Fla. 32807

[21] Appl. No.: 892,791

[22] Filed: Aug. 1, 1986

[51] Int. Cl.[4] ..... G09F 19/14; G09F 7/04

[52] U.S. Cl. ..... 40/453; 40/600

*Primary Examiner*—Stephen C. Buczinski
*Assistant Examiner*—Linda J. Wallace
*Attorney, Agent, or Firm*—Norman E. Reitz

[57] ABSTRACT

A magnetic note holder incorporates a hologram or xogram as the artwork of choice. A standard note holder structure is disclosed which includes a clear laminate adhered to the surface of the artwork, a section of stainless steel tape adhered to the underside of the artwork, a double-sided tape adhered to the underside of the stainless steel tape, and a section of magnetized rubber sheet adhered to the underside of the double-sided tape. A base note holder structure is disclosed which has no section of stainless steel tape. A special note holder structure is disclosed which has two separate sections of stainless steel tape.

1 Claim, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

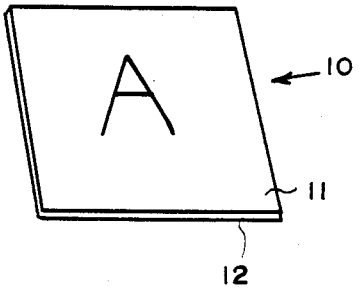
FIG. 1
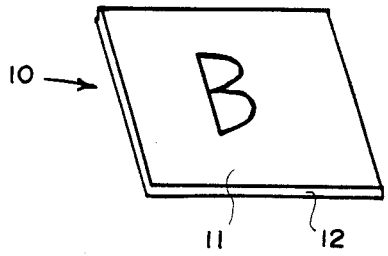
FIG. 1A
FIG. 2
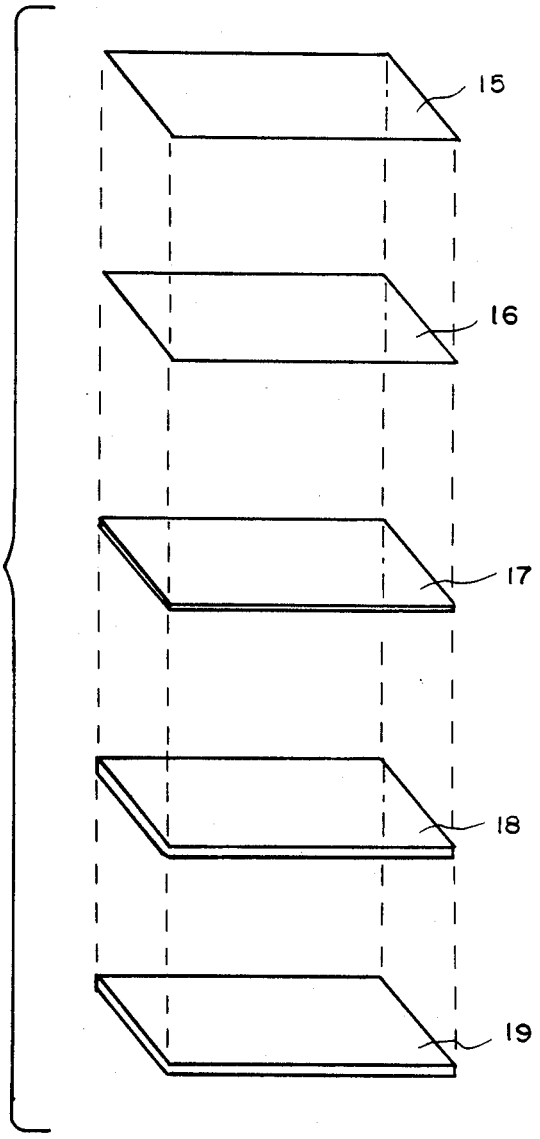

HOLOGRAPHIC AND XOGRAPHIC MAGNETIC NOTE HOLDER STRUCTURES

This invention relates to customized magnetic note holders and, more particularly, relates to magnetic note holders utilizing holographic or xographic artwork.

In a previous Statutory Invention Registration, No. H46, published Apr. 1, 1986, "Process Sequence For Fabricating Durable, Personalized Magnetic Note Holders", the various benefits of making and using magnetic note holders are described. In brief, magnetic note holders are useful objects which allow a person to create a striking visual appeal and to achieve a sense of accomplishment. Such magnetic note holders simulate three-dimensional objects in a two dimensional medium. Various prior art processes for fabricating such magnetic note holders are known. These include processes which require the use of sophisticated process steps or specialized tools [See G. M. Muzik, "Graphic Laminate And Method of Making Same", U.S. Pat. No. 4,197,151] and products aimed at commercial rather than personal applications [See, e.g., L. Stern, "Advertising And Promotional Display Materials", U.S. Pat. No. 4,310,978 and R. W. Mattson, "Magnetic Badge Assembly", U.S. Pat. No. 4,236,331]. And such prior art processes produced products having a measure of visual appeal without providing the utilitarian function of magnetic note holders [See, e.g., J. M. W. Chamberlain, "Decorative Sheet Material And Method Of Making The Same", U.S. Pat. No. 2,293,887 and H. J. Holtz, "Magnetic Display Arrangement", U.S. Pat. No. 3,093,919].

The known benefits of magnetic note holders are extended and amplified by the holographic and xographic structures of the present invention. The amplification lies in the creation of a more realistic three dimensional appearance to the note holders. A limitation of prior art two dimensional note holders is that they present a 'flat' appearance to the observer and also project the same image at all viewing angles. They are best viewed from a position directly above the holder. In practice, however, magnetic note holders are placed on structural objects such as refrigerators, metal closet doors and filing cabinets, and are viewed from a variety of angles. Thus, in use, a note holder is as likely to be viewed from an oblique angle as from a position directly in front of the holder. From these oblique angles the aspect is not always appealing. It would therefore be desirable to provide subjects for magnetic note holders which have three-dimensional characteristics or characteristics that allow viewing from all angles. In order to provide such characteristics without actually utilizing three dimensional objects it is necessary to utilize two dimensional objects which have three dimensional characteristics. Holograms and xograms qualify as such materials. See, e.g., "Holography", in *The Illustrated Science and Invention Encyclopedia,* vol. 9, pp. 1211–1213, (H. S. Stuttman 1977).

The present invention describes magnetic note holder structures which are tailored to utilize holograms and xograms as the subject matter. In addition, the present invention a matrix of structures which may be employed with magnetic note holders, depending upon the particular characteristic sought in the end product. Each of these structures has a particular feature which is useful in displaying the holographic or xographic artwork.

BRIEF DESCRIPTION OF THE DRAWINGS

For a more complete understanding of the magnetic note holder structures of the present invention reference may be had to the accompanying drawings which are incorporated herein by reference and in which:

FIG. 1 is an oblique view of an xographic note holder illustrating one of the primary views;

FIG. 1A is a companion oblique view to the view of FIG. 1; and

FIG. 2 is an exploded view of the second variation of the standard structure of the present invention.

SUMMARY OF THE INVENTION

Magnetic note holders are provided with holographic and xographic artwork in order to simulate three-dimensional objects. Three structural systems are disclosed: base, standard and special magnetic note holder structures. Variations of the three basic structures are also disclosed. As a consequence, the holographic and xographic note holders are displayed in optimum fashion.

DESCRIPTION OF THE PREFERRED EMBODIMENTS

It may be appreciated that the use of xographic or holographic artwork for magnetic note holders both requires special structural features and permits unique structures to be formed. The ensuing text will discuss the primary structural systems contemplated with the structure of the present invention and will discuss briefly their method of fabrication.

The primary characteristic of xographic or holographic note holders is that they display a different image at different angles of orientation. Thus, as seen in FIG. 1, at a particular viewing angle the artwork displays the letter "A". When the artwork 10 is tilted toward the eye of the viewer the surface 11 is viewed at a greater oblique angle. The edge 12 appears to be thicker due to the changed perspective, and the image displayed on the surface 11 is the letter "B" in place of the "A" of FIG. 1. The illusion is created of a three-dimensional object as the note holder is rotated from one position to the other. In order to effectively display the holographic or xographic artwork it is desired to provide suitable structure to the note holder, particularly structure which does not interfere with the visual effect of the artwork displayed on surface 11.

As described in the above cross referenced Statutory Invention Registration, No H46, published Apr. 1, 1986, there are specific building blocks for the magnetic note holder. The teaching of this prior Statutory Invention Registration is incorporated herein by reference, particularly the teaching in columns 3 and 4 thereof, with respect to the specification of and sources of supply for these building blocks. These building blocks include the artwork itself, a clear laminate, a double-sided tape, stainless steel sheet and the magnetic sheet. The building blocks are brought together in a specific sequence by specific steps. The present invention discloses a family of embodiments in which the order of arrangement and presence of particular ones of these building blocks are varied. The key to distinguishing between the three generic structures described in this Statutory Invention Registration, i.e., the base, the standard and the special structure, is the use of stainless steel tape. The base structure utilizes no stainless steel tape; the conventional structure utilizes a single layer of stainless steel tape; and the special structure utilizes two layers of stainless steel tape. The various specific structures are also differentiated by whether a laminate is used and the location of the laminate. A specific description of the various structures and the interrelationship of the component parts is given below.

Base Structure Number 1

The first variation of the base structure includes the following structural elements:

(1) A holographic or xographic artform of choice.
(2) Double-sided tape adhered to the back side of the holographic or xographic artform.
(3) An appropriately sized piece of magnetic tape adhered to the upper side of the double-sided tape.

Base Structure Number 2

The second base structure includes the following structural elements:

(1) A holographic or xographic artform of choice.
(2) A clear laminate adhered to the top side of the artform.
(3) A double-sided tape attached to the bottom of the artform of choice.
(4) An appropriately sized section of magnetic sheet adhered to the underside of the double-sided tape.

Base Structure Number 3

The third base structure has the following structural features:

(1) A holographic or xographic artform of choice.
(2) A clear laminate attached to the underside of the holographic or xographic artform of choice.
(3) A double-sided tape placed on the bottom of the laminate.
(4) A section of magnetic sheet adhered to the underside of the double-sided tape.

Standard Structure Number 1

The first variation of the standard structure includes the following structural elements:

(1) A holographic or xographic artform of choice.
(2) A section of stainless steel tape attached to the underside of the holographic or xographic artform.
(3) A section of double-sided tape attached to the underside of the stainless steel tape.
(4) A section of magnetic sheet adhered to the underside of the double-sided tape.

Standard Structure Number 2

The claimed second variation of the standard structure includes the following structural elements, as shown in FIG. 2 of the drawing:

(1) A holographic or xographic artform 16 of choice.
(2) A section of clear laminate 15 adhered to the top of the holographic or xographic artform 16.
(3) A section of stainless steel tape 17 attached to the underside of the artform 16.
(4) A section of double-sided tape 18 adhered to the underside of the stainless steel tape 17.
(5) A section of magnetic sheet 19 adhered to the underside of the double-sided tape.

Standard Structure Number 3

The third variation of the standard structure contains the following structural elements:

(1) A holographic or xographic artform of choice.
(2) A section of clear acrylic laminate adhered to the underside of the artform.
(3) A section of stainless steel tape adhered to the underside of the laminate.
(4) A section of double-sided tape adhered to the underside of the stainless steel tape.
(5) A section of magnetic sheet adhered to the underside of the double-sided tape.

Special Structure Number 1

The first variation of the special structure includes the following structural features:

(1) A holographic or xographic artform of choice.
(2) A section of stainless steel tape attached to the underside of the artform of choice.
(3) A section of double-sided tape attached to the underside of the first section of stainless steel tape.
(4) A second section of stainless steel tape attached to the underside of the double-sided tape.
(5) A section of magnetic sheet attached to the underside of the second section of stainless steel tape.

Special Structure Number 2

The second variation of the special structure contains the following structural elements:

(1) A holographic or xographic artform of choice.
(2) A section of clear acrylic laminate adhered to the top of the holographic or xographic artform.
(3) A first section of stainless steel tape adhered to the underside of the artform.
(4) A section of double-sided tape adhered to the underside of the first section of stainless steel tape.
(5) A second section of stainless steel tape adhered to the underside of the double-sided tape.
(6) A section of magnetic sheet adhered to the underside of the second section of stainless steel tape.

Special Structure Number 3

The third variation of the special structure includes the following structural elements:

(1) A holographic or xographic artform of choice.
(2) A section of clear acrylic laminate adhered to the underside of the artform of choice.
(3) A first section of stainless steel tape adhered to the underside of the laminate.
(4) A section of double-sided tape adhered to the underside of the first section of the stainless steel tape.
(5) A second section of stainless steel tape adhered to the underside of the double-sided tape.
(6) A section of magnetic sheet adhered to the underside of the second section of stainless steel tape.

It can be seen that a common aspect to the structural features of the structures proposed for magnetic note holders incorporating holograms or xograms is that there should be no visual impairment of the image of the xogram or hologram, and that there should be substantial structural support for the artform since the holograms or xograms may be of appreciable thickness and/or weight.

I claim:

1. A magnetic note holder structure for displaying a hologram or xogram, comprising:

a structurally two-dimensional holograhic or xographic artform of choice;

a sheet section of clear acrylic laminate adhered to the surface of said halographic or xographic artwork of choice;

a sheet section of stainless steel tape adhered to the underside of said holographic or xographic artwork of choice;

a sheet section of double-sided tape adhered to the underside of said sheet section of stainless steel tape; and a section of rubberized, magnetized sheet adhered to the underside of said sheet section of double-sided tape.

* * * * *